United States Patent
Bhatt et al.

(10) Patent No.: US 12,406,074 B1
(45) Date of Patent: Sep. 2, 2025

(54) REQUEST-SCOPE SECURITY TOKENS

(71) Applicant: Amazon Technologies, Inc., Seattle, WA (US)

(72) Inventors: Pankil Bhatt, Seattle, WA (US); David Gootman, Vancouver (CA); Jose Pragash Maria Susai, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 313 days.

(21) Appl. No.: 17/214,246

(22) Filed: Mar. 26, 2021

(51) Int. Cl.
*G06F 21/00* (2013.01)
*G06F 21/44* (2013.01)
*G06F 21/60* (2013.01)
*G06F 21/62* (2013.01)

(52) U.S. Cl.
CPC .......... *G06F 21/606* (2013.01); *G06F 21/44* (2013.01); *G06F 21/6227* (2013.01); *G06F 2221/2141* (2013.01)

(58) Field of Classification Search
CPC .... G06F 21/44; G06F 21/606; G06F 21/6227; G06F 2221/2141
See application file for complete search history.

(56) References Cited

U.S. PATENT DOCUMENTS

| | | | | |
|---|---|---|---|---|
| 11,270,021 | B2* | 3/2022 | Dunjic | G06F 21/6236 |
| 11,388,006 | B2* | 7/2022 | Wang | H04L 9/12 |
| 2012/0079288 | A1* | 3/2012 | Hars | H04L 63/083 |
| | | | | 713/193 |
| 2012/0324099 | A1* | 12/2012 | Perez Martinez | H04W 4/18 |
| | | | | 709/224 |
| 2015/0281241 | A1* | 10/2015 | Sharma | H04L 9/083 |
| | | | | 726/9 |
| 2021/0286883 | A1* | 9/2021 | Prabhu | H04L 9/008 |

FOREIGN PATENT DOCUMENTS

WO WO-2017014614 A1 * 1/2017 ........... H04L 63/061

* cited by examiner

*Primary Examiner* — Rodman Alexander Mahmoudi
(74) *Attorney, Agent, or Firm* — Klarquist Sparkman, LLP

(57) ABSTRACT

Technologies are provided for preventing unauthorized requests using request identifiers associated with security tokens. A request can be received by a computing device that contains a request identifier and one or more security tokens. The computing device can determine whether the request identifier contained in the request is associated with all of the one or more security tokens contained in the request. If the request identifier is not associated with one or more of the security tokens, then the computing device can reject the request. If the request identifier is associated with the one or more security tokens, then the computing device can generate another request that includes one or more protected data items that are associated with the one or more security tokens. The computing device can then transmit the another request containing the one or more protected data items to another computing device for processing.

20 Claims, 8 Drawing Sheets

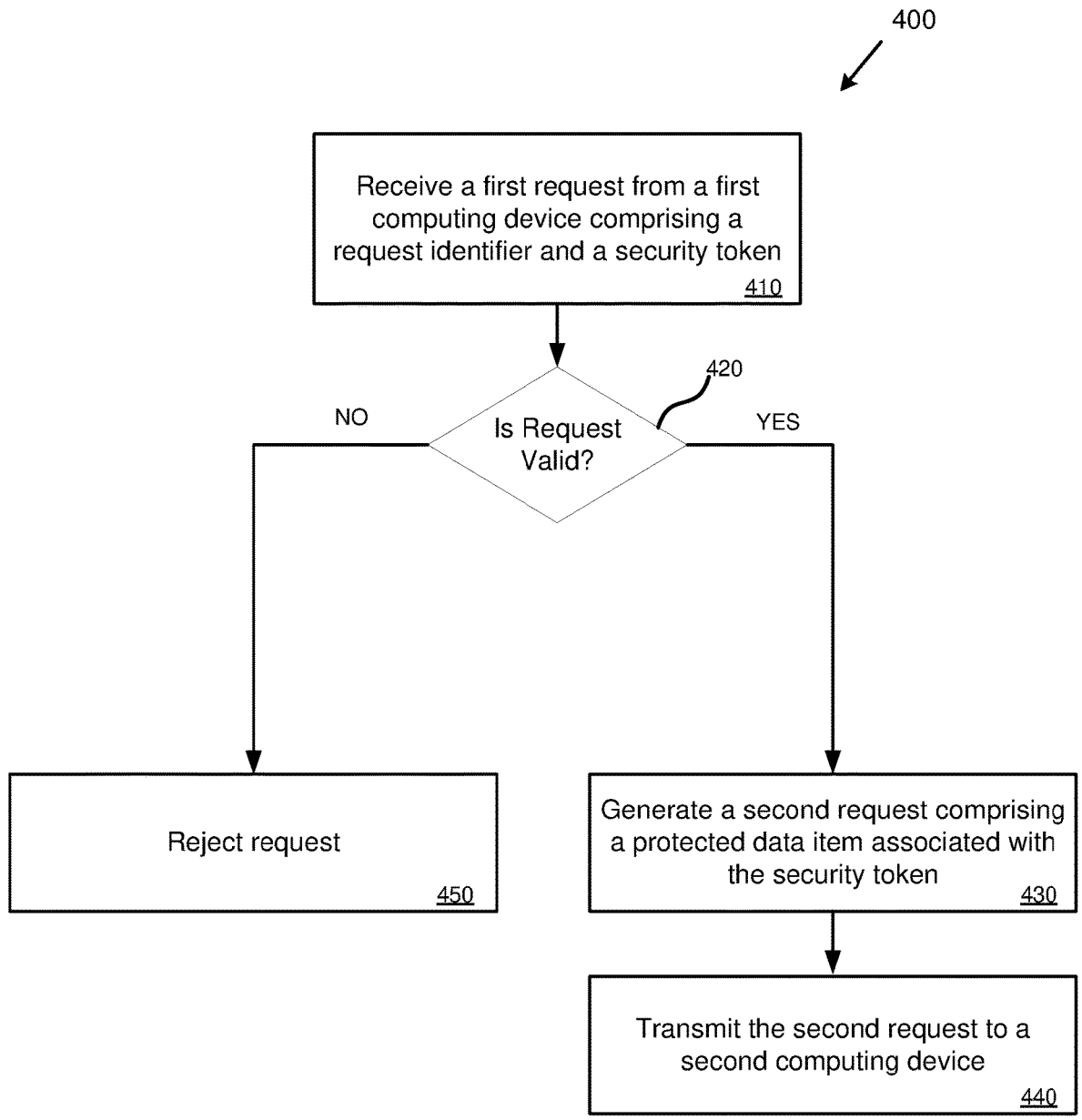

FIG. 5

```
{
  "request_id": "WY16bkEcbuGN3LnCheHQm9",
  "partial_message": {
    "http_method": "GET",
    "path": "/authorization",
    "headers": {
      "Host": "partner_x_site.com",
      "Content-Type": "application/json",
    },
    "body": "{\"id\":\"WY16bkEcbuGN3LnCheHQm9\",
             \"currency\":\"USD\", \"cardInfo\":{},
             \"billingActor\":{}}"
  },
  "privileged_operations": {
    "add_field": {
        "path": "$.body.amount",
        "value": {"detokenize":{
          "token":"ff4eda11294ca490df3499"}}
    },
    "add_field": {
        "path": "$.body.cardInfo.cardNumber",
        "value": {"detokenize":{
          "token":"cd4015ef023d37ee44873a"}}
    },
    "add_field": {
        "path": "$.body.cardInfo.expiryDate",
        "value": {"detokenize":{
          "token":"65043700378025544ffa34"}}
    },
    "add_field": {
        "path": "$.body.billingActor.name",
        "value": {"detokenize":{
          "token":"baab8722f3bf48293d1104"}}
    },
    "add_field": {
        "path": "$.body.billingActor.address",
        "value": {"detokenize":{
          "token":"100feb793dda50222abab2"}}
    }
  }
}
```

FIG. 7

```
{
    "request_id": "WY16bkEcbuGN3LnCheHQm9",
    "currency": "USD",
    "category": "Card",
    "amount_token": "ff4eda11294ca490df3499",
    "card_number_token": "cd4015ef023d37ee44873a",
    "expiry_date_token": "65043700378025544ffa34",
    "account_holder_name_token": "baab8722f3bf48293d1104",
    "billing_address_token": "100feb793dda50222abab2"
}
```

REQUEST-SCOPE SECURITY TOKENS

BACKGROUND

In some scenarios, untrusted computers are used to perform operations or make requests that involve protected or sensitive data. Since the computer is not trusted, it may be desirable to have the computer perform these tasks in a way that does not involve sharing the protected or sensitive data with the untrusted computer. One possible approach is to encrypt the protected or sensitive data and to share the encrypted version of the data with the untrusted computer. However, there is a risk that the untrusted computer may be able to decrypt the encrypted data and gain access to the protected or sensitive data. Another approach that avoids this risk is to generate tokens that are associated with the protected or sensitive data, and to share the tokens with the untrusted computer instead of the protected or sensitive data.

BRIEF DESCRIPTION OF THE DRAWINGS

FIG. 4 is flowchart of a method for processing a request comprising a request identifier and a security token.

FIG. 5 is a diagram depicting an example request comprising a request identifier and a plurality of security tokens.

FIG. 7 is a diagram depicting an example transmission comprising a request identifier and a plurality of security tokens.

FIG. 9 is a diagram depicting a generalized example of a suitable computing environment in which the described innovations may be implemented.

DETAILED DESCRIPTION

Figure 1:
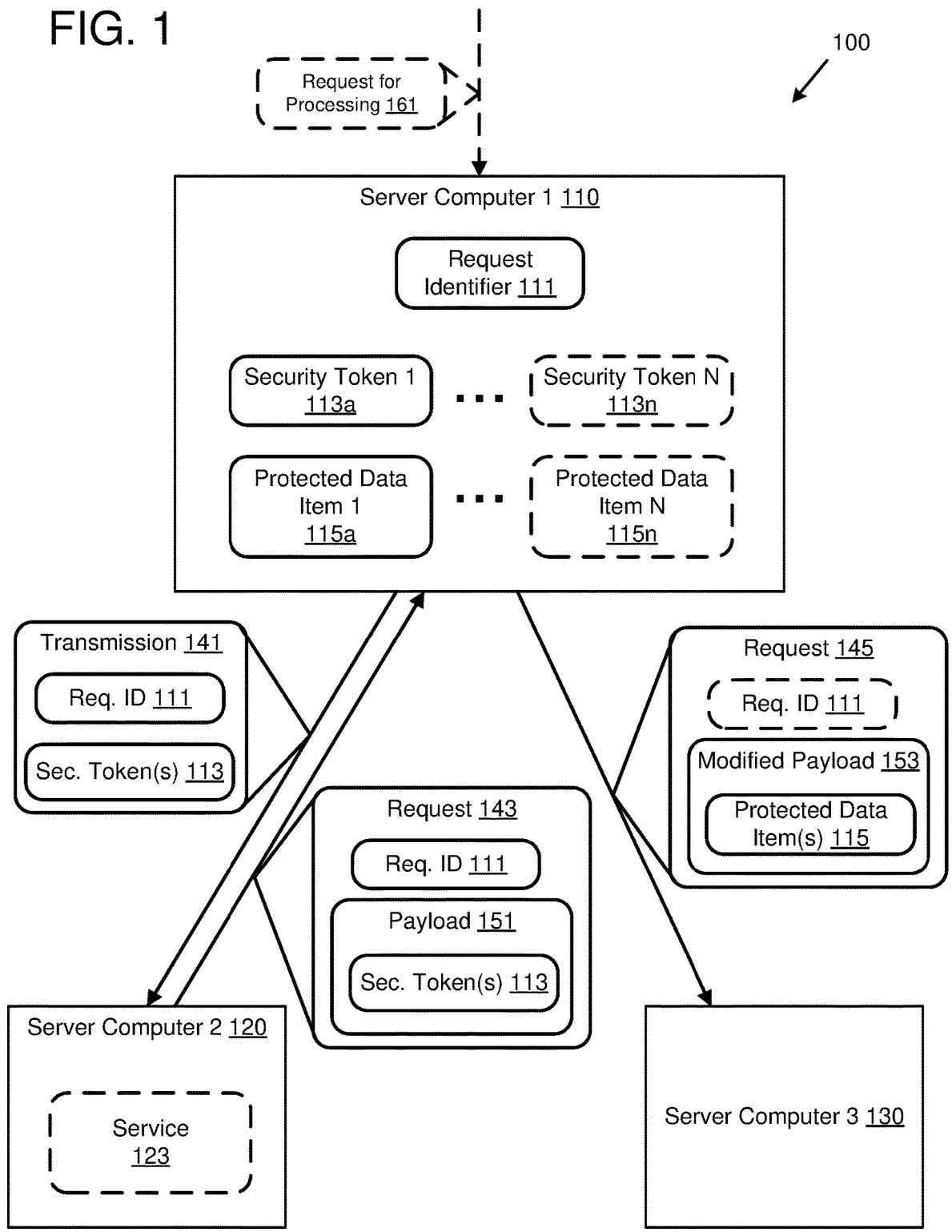
FIG. 1 is a system diagram depicting an example system configured for processing requests comprising request-scope security tokens.

The following description is directed to technologies for processing requests comprising security tokens that are associated with protected data items.

In at least some scenarios, security tokens can be provided to untrusted computers for processing instead of protected and/or sensitive data. For example, in a scenario where an untrusted computing device is configured to generate a request for processing by another computing device using protected data, a security token associated with the protected data can be provided to the untrusted computing device instead of the protected data. The untrusted computing device can then generate a request using the security token. The request can then be transmitted to a trusted intermediary computing device that can generate another request comprising the protected and/or sensitive data associated with the security token and transmit the another request to the another computing device for processing.

However, in at least some cases, there may still be a risk that the untrusted computing device can commit malicious acts when it is provided with a security token instead of protected data. For example, the untrusted computing device may be able to submit unauthorized requests using the security token. Even when the untrusted computing device does not know the protected data associated with the security token, it may still be able to cause multiple operations to be performed using the protected data by submitting multiple requests with the security token. In another example, a malicious user may gain control of the untrusted computing device and may be able to substitute a security token associated with the malicious user's information (such as the malicious user's bank account information) for a security token that is supposed to be part of a request. The intermediary computing device that receives the manipulated request might then unwittingly process the request by generating a request comprising the malicious user's information instead of the information associated with the correct security token. In another example, if the same security tokens are associated with protected data items across multiple requests and are provided to the untrusted computing device, a malicious user that has gained control of the untrusted computing device may be able to reverse engineer the protected data items by making repeated requests with various values that cause security tokens to be sent to the untrusted computing device. By observing the generated security tokens, the malicious user can build a list of submitted values and their associated security tokens.

At least some of the embodiments described herein can solve these problems by associating request identifiers with security tokens, and determining whether a request identifier contained in a received request is associated with every security token contained in the request. A request identifier and one or more security tokens can be provided to an untrusted computing device. The untrusted computing device can generate a request for processing using protected data that includes the one or more security tokens instead of the protected data. The request can also be required to include the provided request identifier. The request can be transmitted by the untrusted computing device to a trusted intermediary computing device that has access to the protected data. The trusted computing device can verify that the request identifier in the request is associated with the one or more security tokens in the request. If the request identifier is not associated with each of the one or more security tokens, then the intermediary computing device can reject the request.

In a different or further embodiment, a request identifier and one or more security tokens can be generated for each request. For example, a trusted computing device can receive a request for processing using one or more protected data items by another computing device. The trusted computing device can generate a request identifier and one or more security tokens that are associated with the one or more protected data items. The trusted computing device can transmit the request identifier and the one or more security tokens to an untrusted computing device in order to cause the untrusted computing device to generate a request for processing by the another computing device, wherein the generated request includes the request identifier and the one or more security tokens. The trusted computing device can receive the request from the untrusted computing device and verify that the request identifier included in the request is associated with the one or more security tokens in the request. If the request identifier is associated with the one or more security tokens, the trusted computing device can generate another request that includes the one or more protected data items associated with the one or more security tokens. The trusted computing device can then transmit the another request to the another other computing device for processing using the one or more protected data items. If the request identifier is not associated with the one or more security tokens, then the trusted computing device can reject the request. Thus, in at least some scenarios, the trusted computing device can ensure that the security tokens are only usable as part of a request that includes the associated request identifier, and that the security tokens cannot be used in any other requests.

In at least some embodiments, generating the another request can comprise generating a modified version of the request received from the untrusted computing device. For example, the trusted computing device can create a version of the request received from the untrusted computing device in which the one or more security tokens are replaced with the one or more protected data items associated with the one or more security tokens.

In a different or further embodiment, the request identifier and/or one or more security tokens can be deleted or marked as unusable after the trusted computing device transmits the another request comprising the one or more protected data items. For example, the request identifier, one or more security tokens, and one or more protected data items can be stored in a security record associated with the request identifier. After transmitting the another request comprising the one or more protected data items, the trusted computing device can delete the security record. In at least some embodiments, deleting the request identifier and/or one or more security tokens can help ensure that the request identifier and/or one or more security tokens are not used in any other requests.

Additionally or alternatively, identifiers that limit the use of security tokens may be associated with other operational scopes besides requests. For example, security tokens can be associated with transaction identifiers. A transaction identifier may be associated with a transaction that comprises multiple requests. In such an embodiment, the associated security tokens may be usable in a plurality of authorized requests that are associated with a given transaction scope.

FIG. 1 is a system diagram depicting an example system 100 configured for processing requests (e.g., 143) comprising request identifiers (e.g., 111) and one or more security tokens (e.g., 113). The example system 100 comprises a server computer 110 that comprises one or more security tokens 113 that are associated with one or more protected data items 115. For example, security token 113a can be associated with protected data item 115a, security token 113n can be associated with protected data item 115n, etc. The server computer 110 further comprises the request identifier 111 that is associated with the one or more security tokens 113. Although it is not depicted, it is possible for the server computer 110 to comprise multiple request identifiers that are associated with different security tokens. For example, the sever computer 110 can comprise the request identifier 111 associated with the one or more security tokens 113 (which are in turn associated with the protected data items 115), and one or more other request identifiers (not shown) that are associated with one or more other security tokens (not shown).

The server computer 110 is configured to transmit a transmission 141 comprising the request identifier 111 and the one or more security tokens 113 to another server computer 120. Although the request identifier 111 and the one or more security tokens 113 are depicted in IFG. 1 as being part of the same transmission 141, in at least some embodiments the request identifier 111 and the one or more security tokens 113 are transmitted in multiple transmissions. The size and number of transmissions can be based on a transmission protocol (such as TCP/IP, UDP, HTTP, etc.) that is used by the server computer 110 to communicate with the server computer 120. The server computer 110 can transmit the request identifier 111 and one or more security tokens 113 via one or more wired and/or wireless communication channels. In at least some embodiments, the request identifier 111 and the one or more security tokens 113 can be transmitted via a computer network to which the server computer 110 and the server computer 120 are connected.

The server computer 120 is configured to receive the request identifier 111 and the one or more security tokens 113 from the server computer 110 and to generate a data payload 151 comprising the one or more security tokens 113. The payload 151 can comprise one or more data structures that include the one or more security tokens 113. In at least some embodiments, the data payload 151 can comprise a partial (e.g., incomplete) request to be transmitted to another server computer 130 for processing. In such an embodiment, the one or more security tokens 113 can be included in locations within the data payload 151 that should contain the one or more protected data items 115 when the request is transmitted to the other server computer 130. Additionally or alternatively, the data payload 151 can comprise instructions that, when processed by the server computer 110, cause the server computer 110 to generate a modified data payload 153. The server computer 120 is further configured to transmit a request 143 comprising the request identifier 111 and the data payload 151 to the server computer 110.

The server computer 110 is configured to receive the request 143 from the server computer 120. The server computer 110 is further configured to determine whether the request identifier 111 contained in the request 143 is associated with the one or more security tokens 113 contained in the data payload 151. The server computer 110 can be configured to store request identifiers (e.g., 111) in association with one or more security tokens (e.g., 113) in one or more memories and/or one or more storage media (not shown). Upon receipt of the request 143, the server computer 110 can inspect the request 143 to identify the request identifier 111 contained within the request 143. The server computer 110 can search the one or more memories and/or one or more storage media for a request identifier that matches the request identifier 111. If the request identifier 111 is found, the server computer 110 can identify any security tokens that are associated with the request identifier 111. If the one or more security tokens associated with the request identifier 111 match the one or more security tokens 113 contained in the data payload 151, then the server computer 110 can determine that the request identifier 111 contained in the request 143 is in fact associated with the one or more security tokens 113 contained within the data payload 151.

Based on the determination that the request identifier 111 is associated with the one or more security tokens 113, the server computer 110 can generate a modified version of the data payload 153 that comprises the one or more protected data items 115 that are associated with the one or more security tokens 113. In at least some embodiments, generating the modified version of the data payload 153 can comprise replacing the one or more security tokens 113 in the data payload 151 with the one or more protected data items 115 that are associated with the one or more security tokens 113. For example, the server computer 110 can create the modified version of the data payload 153 by copying the data payload 151 and replacing the one or more security tokens 113 in the copy with the one or more protected data items 115 that are associated with the security tokens 113. The server computer 110 can then transmit a request 145 comprising the modified version of the data payload 153 to the other server computer 130 for processing.

In at least some embodiments, generating the modified version of the payload 153 can comprise processing one or more instructions contained within the data payload 151. For example, the data payload 151 can comprise a partial request to be transmitted to the other server computer 130, along with instructions for completing the request using the one or more protected data items 115 that are associated with the one or more security tokens 113. In such an embodiment, the completed request can be the request 145 that is transmitted to the other server computer 130.

The server computer 110 can be configured to reject a request where the request identifier is not associated with one or more security tokens contained in a data payload of the request. For example, after receiving the request 143, the server computer 110 may receive another request (not shown), wherein the another request comprises another request identifier and another data payload comprising the one or more security tokens 113. The server computer 110 can determine that the another request identifier is not associated with the one or more security tokens 113 and can reject the request. The request identifier (e.g., 111) can be an identifier that is only good for use with a single request (e.g., 143), and the one or more security tokens 113 can be associated with the request identifier 111 in order to ensure that they are only used as part of a request (e.g., 143) containing the request identifier 111.

For example, the request 143 can be an idempotent request that, if processed more than once by the server computer 110, would result in a regeneration of the request 145 and not a new request. Thus, in at least some scenarios, repeated transmissions of the request 143 by the server computer 120 would not result in the generation of multiple, different modified requests. Furthermore, since the security tokens 113 are associated with the request identifier 111, the server computer 120 (or another server computer) is unable to issue a new request with a different request identifier that includes the one or more security tokens 113 since the server computer 110 would reject such a request as unauthorized.

In another example, the request identifier 111 and/or the security tokens 113 can be deleted after the server computer 110 generates the request 145 and/or transmits the request 145 to the other computing device 130. In at least some scenarios, deleting the request identifier 111 and/or the security tokens 113 can cause the server computer 110 to reject any other requests that contain the request identifier 111 and/or security tokens 113 since they will no longer be accessible by the server computer 110.

Optionally, the server computer 120 can comprise a service 123 that is configured to generate the data payload 151. For example, the service 123 can be configured to generate data payloads that can be processed by the other server computer 130, after protected data items associated with the security tokens in the data payloads have been added to the data payloads by the server computer 110. In such an embodiment, the server computer 110 can be configured to reject any request comprising the request identifier 111 that is not received from the service 123. For example, the server computer 110 can associate the request identifier 111 with the service 123. After receiving the request 143, the server computer 110 can determine that the request 143 is associated with the service 123. For example, the server computer 110 can identify the request identifier 111 in the request 143, determine that the request identifier 111 is associated with the service 123, and determine that the request 143 and/or the data payload 151 was generated by the service 123. For example, the server computer 110 can determine that the request 143 was received via a communication channel associated with the service 123. Additionally or alternatively, the service 123 can be configured to digitally sign the request 143 and/or the data payload 151, and the server computer 110 can be configured to verify the authenticity of the digital signature. Other techniques for determining that the request 143 is associated with, or received from, the service 123 are also possible. The server computer 110 can be configured to receive another request (not shown) comprising the request identifier 111. The server computer 110 can determine that the another request is not associated with the service 123, and can reject the another request.

The server computer 110 can be configured to generate the modified version of the data payload 153 based on the determination that the request identifier is associated with the service 123 and that the request identifier 111 is associated with the one or more security tokens 113. The server computer 110 can be configured to reject a request if it determines that the request contains a request identifier associated with a service that is not associated with the request. For example, the server computer 110 can receive another request (not shown) that comprises the request identifier 111. If the server computer 110 determines that the another request is not associated with the service 123, then the server computer 110 can reject the another request. In at least some scenarios, this can allow the server computer 110 to ensure that, if a request identifier (e.g., 111) and one or more security tokens (e.g., 113) are transmitted to a computing device (e.g., server computer 120) and/or service (e.g., 123), only that computing device and/or service can transmit a request (e.g., 143) that includes the request identifier and the one or more associated security tokens.

In at least some embodiments, the service 123 can comprise a program that is developed by a third party and is hosted in a server environment with the server computer 110. In such an embodiment, the server computer 110 can act as an intermediary device that allows the service 123 to trigger authorized requests to the server computer 130 without giving the service 123 access to any protected data items (e.g., 115).

In a different or further embodiment, one or more of the security tokens 113 can be associated with data item types of protected data items. Example data item types include field names associated with protected data items. The server computer 110 can be configured to transmit the request identifier 111, the one or more security tokens 113, and any data item type(s) of the one or more protected data items 115 associated with the one or more security tokens 113. For example, the transmission 141 can indicate that the security token 113*a* is associated with a data item type of the protected data item 115*a*, that the security token 113*n* is associated with a data item type of the protected data item 115*n*, etc. In a particular example, the transmission 141 can indicate that the security token 113*a* is associated with a user name (for which the protected data item 115*a* holds a value) and that the security token 113*n* is associated with a credit card number (for which the protected data item 115*n* holds a value).

The data item type(s) associated with the one or more security tokens 113 can be used by the server computer 120 and/or the service 123 to generate the data payload 151. For example, the one or more security tokens 113 can be organized in the data payload 151 based on the associated data item types in order to ensure that, when the one or more protected data items 115 are added to the modified version of the payload 153 by the server computer 110, the modified version of the data payload 153 is in a format that can be processed by the other server computer 130. For example, in a scenario where the server computer 110 replaces the one or more security tokens 113 with one or more associated protected data items 115, the security tokens 113 can be located in the positions in the data payload 151 that are associated with the data item types of the associated protected data items 115. In such an embodiment, when the server computer 110 replaces the one or more security tokens 113 with the one or more protected data items 115, the one or more protected data items 115 will be located in positions in the modified version of the data payload 153 that are associated with their respective data item types.

Optionally, the server computer 110 can be configured to receive a request for processing 161. The request 161 can be a request for processing by the other server computer 130 using the one or more protected data items 115. In at least some embodiments, the request 161 can be received from a client computing device (not shown) that is associated with the one or more protected data items 115. For example, the request 161 can be received from a computing device associated with an authenticated user session and the one or more protected data items 115 can be associated with the same authenticated user session.

Responsive to receiving the request 161, the server computer 110 can generate the request identifier 111 and the one or more security tokens 113, associate the one or more security tokens 113 with the request identifier 111, and transmit the request identifier 111 and the one or more security tokens 113 to the server computer 120. The server computer 110 can also be configured to associate the one or more security tokens 113 with the one or more protected data items 115. After receiving the request 143 from the server computer 120, the server computer 110 can generate the modified version of the data payload 153 and transmit the request 145 to the other server computer 130 for processing. In at least some embodiments, the server computer 110 can receive a response (not shown) from the server computer 130 and can transmit a response (not shown) to the request 161 base on the response received from the server computer 130.

In any of the embodiments described herein, a computer network can comprise a plurality of network devices configured to transmit network packets to one another. Network devices in a network can be connected by wired connections, wireless connections, or some combination thereof. Example types of computer networks include local area networks (such as a network local to a data center), remote networks (such as networks located external to a data center containing a server computer or other computing device which communicates with the network), virtual cloud networks (such as networks comprising servers and or virtual machines operating in a cloud computing environment), remote embedded networks (such as remote networks which are hosted by third parties), satellite networks, etc.

In any of the embodiments described herein, a service can comprise one or more processes executing on one or more computing devices. In at least some embodiments, a service can be provided by a third party for the purposes of generating requests in a format that can be processed by another computing device. The service can be configured to receive a request identifier and one or more security tokens and to generate a request comprising the request identifier and the one or more security tokens that is in a format (or that contains a data payload that is in a format) that can be processed by the another computing device. In at least some embodiments, the service and the another computing device can be controlled by a same third party. Additionally or alternatively, the service and a computing device that transmits the request identifier and one or more security tokens to the service can be part of a same computer environment (such as a computer network, data center, subdomain, etc.)

In any of the embodiments described herein, a security token can comprise an alphabetic, numeric, or alphanumeric value that is associated with a protected data item. Example security tokens include randomly generated number, globally unique identifiers (GUIDs), universally unique identifiers (UUIDs), or the like. In at least some scenarios, a security token can be generated using a cryptographic random number generator. A security token can be generated and associated with a protected data item. The security token can then be provided to untrusted computing devices instead of the protected data item. The security token can be associated with a request identifier. In at least some embodiments, a security token is only usable as part of a request that contains the associated request identifier.

In any of the embodiments described herein, a protected data item can be a datum that cannot or should not be shared with an untrusted computing device. What sort of data qualify as protected data items can be context-specific and may be based on legal requirements, governing privacy regulations, and/or user preferences. Examples of data that may qualify as protected data items include account user names, passwords, email addresses, account billing information, credit card information, bank account information, medical history, etc.

Figure 2:
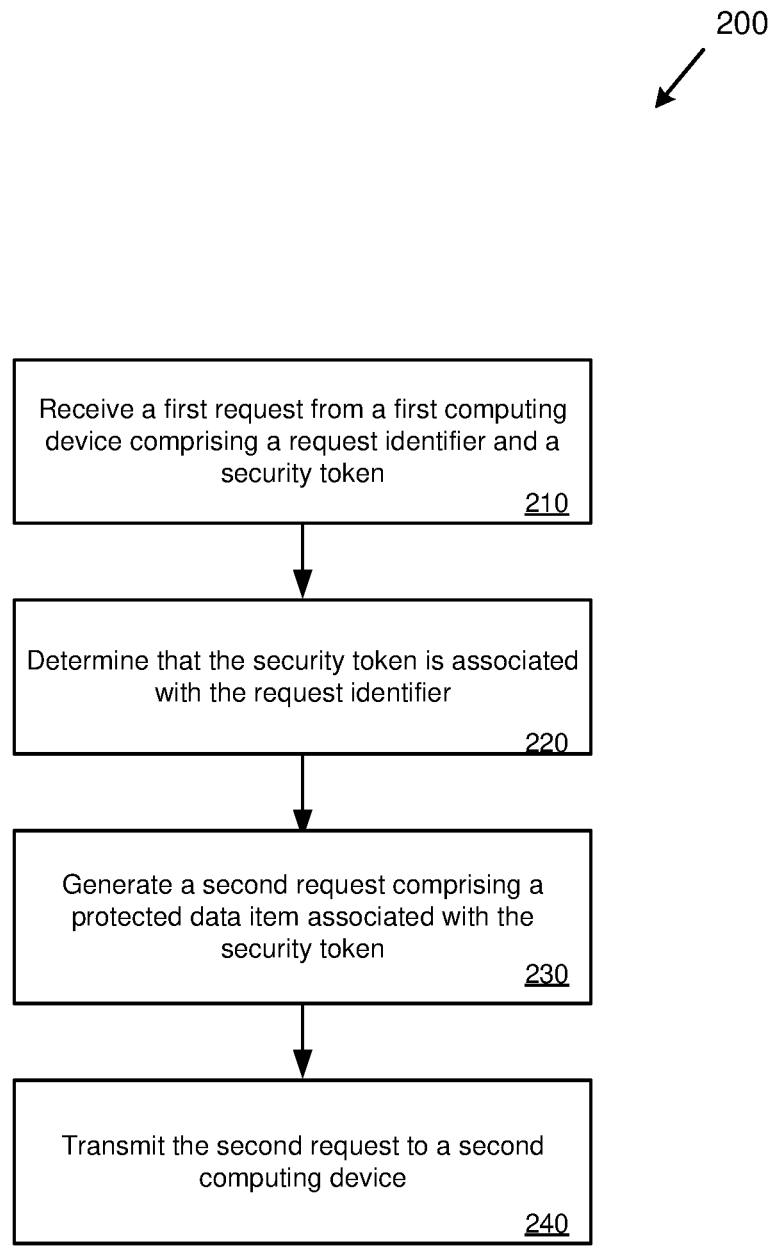
FIG. 2 is a flowchart of an example method for processing a request comprising a request-scope security token.

FIG. 2 is a flowchart of an example method 200 for processing a request comprising a request identifier and a security token. Any of the example systems described herein can be used to perform all or part of the example method 200.

Figure 3:
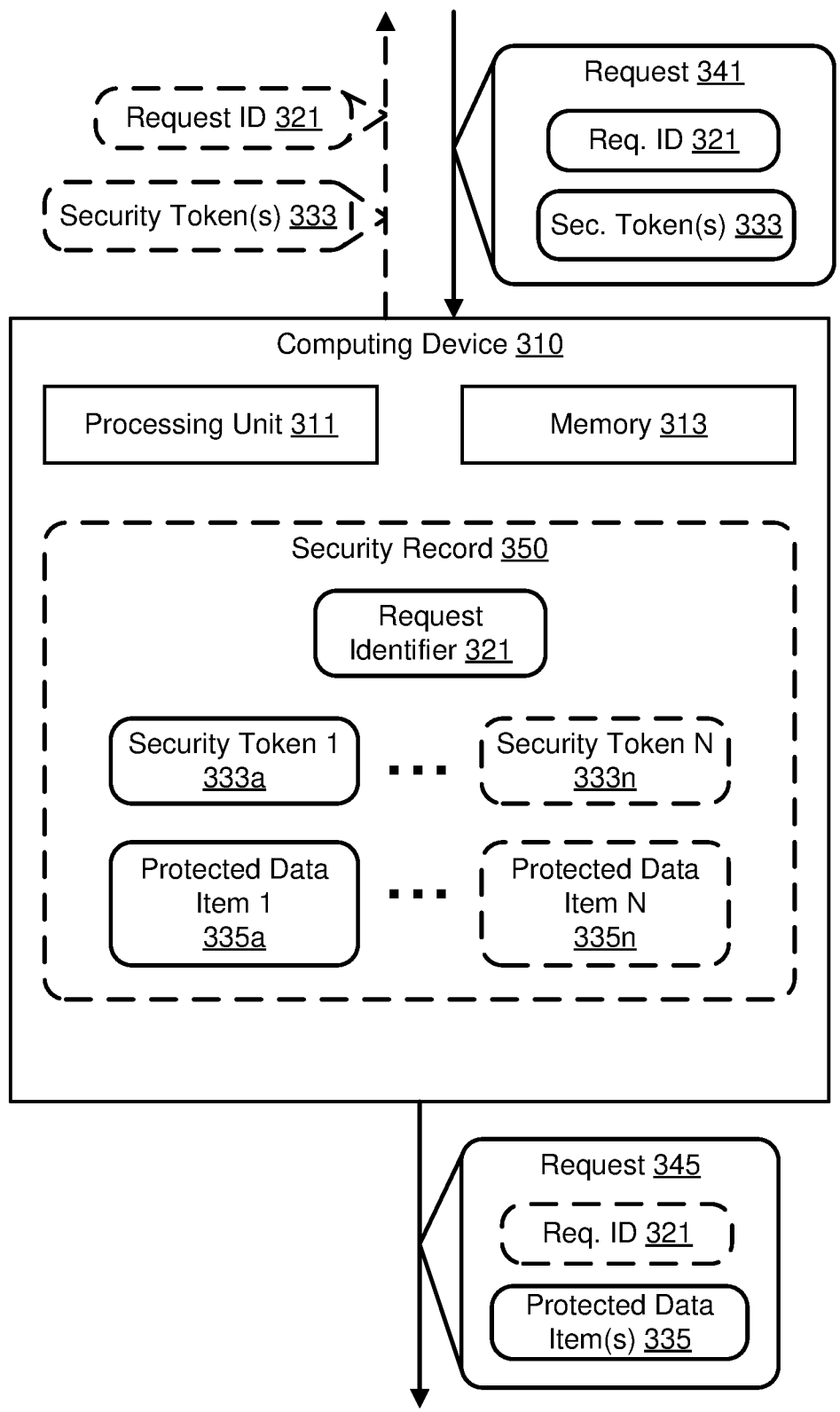
FIG. 3 is a diagram depicting an example computing device configured to process requests comprising request-scope security tokens.

For example, the example computing device 310 depicted in FIG. 3 can be used to perform all or part of the example method 200. FIG. 3 is a diagram depicting the example computing device 310. The computing device 310 comprises a processing unit 311 and a memory 313 storing instructions that, when executed by the processing unit 311, cause the computing device to perform operations related to requests comprising request identifiers and security tokens.

Referring to FIG. 2, at 210 a first request is received from a first computing device, wherein the first request comprises a request identifier and a security token. For example, the computing device 310 can receive a request 341 comprising a request identifier 321 and one or more security tokens 333. The request 341 can be received from a source computing device (not shown), via one or more wired and/or wireless communication channels. For example, the request 341 can be received via a computer network to which the computing device 310 and the source computing device are connected. In at least some embodiments, the request 341 can be a request for one or more operations to be performed by a destination computing device (not shown) using one or more protected data items 335 that are associated with the one or more security tokens 333.

At 220, it is determined that the security token is associated with the request identifier. For example, the computing device 310 can determine that the one or more security tokens 333 is/are associated with the request identifier 321. In at least some embodiments, the computing device 310 can retrieve a security record associated with the request identifier 321 and determine using the security record that the request identifier 321 is associated with the one or more security tokens 333. For example, the computing device 310 can comprise a security record 350 comprising the request identifier 321 and the one or more security tokens 333. By verifying that the security record 350 for the request identifier 321 contains the one or more security tokens 333 included in the request 341, the computing device 310 can determine that the request identifier 321 is associated with the one or more security tokens 333. Optionally, such a security record may also contain the one or more protected data items 335 associated with the one or more security tokens 333. In at least some embodiments, the security record 350 can be stored in the memory 313 of the computing device 310. Additionally or alternatively, all or part of the security record 350 can be stored in another storage medium (not shown) of the computing device 310 and/or one or more other computing devices (not shown). For example, the computing device 310 can retrieve the security record from a remote storage device (not shown) that is connected to the computing device 310 via one or more wired and/or wireless communication channels.

At 230, based on the determining, a second request is generated, wherein the second request comprises a protected data item associated with the security token. For example, based on the determining that the request identifier 321 is associated with the one or more security tokens 333, the computing device 310 can generate a request 345 that comprises one or more protected data items 335 associated with the one or more security tokens 333. In at least some embodiments, generating the request 345 can comprise replacing the one or more security tokens 333 in the request 341 with the one or more protected data items 335 associated with the one or more security tokens 333. For example, the computing device 310 can copy the request 341 and, for each of the one or more security tokens 333, the computing device 310 can look up one of the one or more protected data items 335 that is associated with the security token and replace the security token with the associated protected data item. Additionally or alternatively, the computing device 310 can be configured to generate a modified version of a data payload that contains the one or more security tokens 333 in the request 341, wherein the modified version of the data payload contains the one or more protected data items 335 associated with the one or more security tokens 333 instead of the one or more security tokens 333. Additionally or alternatively, the computing device 310 can be configured to generate the request 345 by using the one or more protected data items 335 to complete a partial data payload that is contained within the request 341. In at least some such embodiments, the request 341 can comprise instructions for modifying the partial data payload using the one or more protected data items 335 that are associated with the one or more security tokens 333 contained in the request 341. Optionally, the request 345 can include the request identifier 321.

At 240, the second request is transmitted to a second computing device. For example, the computing device 310 can transmit the request 345 to a destination computing device (not shown). The computing device 310 can transmit the request 345 via one or more wired and/or wireless communication channels. For example, the computing device 310 can transmit the request 345 via a computer network to which the computing device 310 and the destination computing device are connected.

The example method 200 can further comprise generating the security token, associating the security token with the protected data item, generating the request identifier, associating the request identifier with the security token, and/or transmitting the security token and the request identifier to the first computing device. For example, the computing device and 310 can generate the one or more security tokens 333 and associate the one or more security tokens 333 with the one or more protected data items 335. Associating the one or more security tokens 333 with the one or more protected data items 335 can comprise generating the security record 350 and storing the one or more security tokens 333 in association with the one or more protected data items 335 in the security record 350. The computing device 310 can generate the request identifier 321 and associate the one or more security tokens 333 with the request identifier 321. Associating the one or more security tokens 333 with the request identifier 321 can comprise using the security record 350. For example, the computing device 310 can store the request identifier 321 in the security record 350 with the one or more security tokens 333. Additionally or alternatively, the computing device 310 can store the security record 350 as part of an index or table for which the request identifier 321 is used as a key to look up the security record 350.

The computing device 310 can transmit the request identifier 321 and the one or more security tokens 333 to the source computing device (not shown). In at least some embodiments, the computing device 310 can transmit the request identifier 321 and the one or more security tokens 333 to the source computing device in order to cause the source computing device to generate the request 341 and to transmit the request 341 to the computing device 310. For example, the request 341 can be generated by the source computing device in a format that can be processed by the destination computing device after the computing device 310 has added the one or more protected data items 335 associated with the one or more security tokens 333.

In at least some embodiments, transmitting the security token and the request identifier to the first computing device comprises transmitting a message in which the security token is associated with a data item type of the protected data item. For example, the computing device 310 can transmit a message (not shown) in which the one or more security tokens 333 are associated with data item types of the one or more protected data items 335. For example, the message can associate the security token 333a with a data item type of the protected data item 335a, associate the security token 333n with the protected data item 335n, etc.

The example method 200 can further comprise receiving another request from the first computing device or another computing device, wherein the another request comprises the security token and another request identifier; determining that the security token is not associated with the another request identifier; and rejecting the another request. For example, the computing device 310 can receive another request (not shown) from the source computing device, wherein the another request comprises the one or more security tokens 333 and another request identifier. The computing device 310 can determine that the another request identifier is not associated with the one or more security tokens 333. For example, the computing device 310 can retrieve another security record associated with the another request identifier and determine, based on the another security record that the another request identifier is not associated with the one or more security tokens 333 contained in the another request. After determining that the another request identifier is not associated with that the one or more security tokens 333, the computing device 310 can reject the another request. In this way, the computing device 310 can be used to ensure that a request will only be processed if it contains a valid request identifier and security tokens that are associated with that valid request identifier.

In at least some embodiments, the example method 200 further comprises assigning the request identifier to a service. In such an embodiment, the example method 200 can comprise determining that the request received from the first computing device is associated with the service, and generating the modified version of the request based on the determining that the request identifier is associated with the security token and the determining that the request is associated with the service. For example, the example computing device 310 can transmit the request identifier 321 and the one or more security tokens 333 to a service running on the source computing device. The computing device 310 can assign the request identifier 321 to the service (not shown). For example, the computing device 310 can store an identifier associated with the service in the security record 350 in association with the request identifier 321. After receiving the request 341 from the source computing device, the computing device 310 can determine that the request 341 is associated with the service. For example, the computing device 310 can determine that the request 341 is received via a communication channel associated with the service. Additionally or alternatively, the computing device 310 can determine that the requested 341 is signed with a digital signature using a digital certificate associated with the service. Other techniques for ascertaining the association between the service and the request 341 can also be used. The computing device 310 can generate the request 345 based on the determining that the request identifier 321 is associated with the one or more security tokens 333 and the determining that the request 341 is associated with the service.

In a different or further embodiment, the request identifier and/or the security token can be deleted or marked as unusable after the second request is generated or after the second request is transmitted to the second computing device. For example, the computing device 310 can be configured to delete the security record 350 after generating the request 345 or transmitting the request 345 to the destination computing device. In such an embodiment, a subsequent request containing the request identifier 321 and/or the one or more security tokens 333 can be rejected since the security record 350 associating the request identifier 321 with the one or more security tokens 333 no longer exists.

FIG. 4 is a flowchart of an example method 400 for processing a request comprising a request identifier and a security token. Any of the example systems described herein can be used to perform all or part of the example method 400. For example, the example computing device 310 can be used to perform all or part of the example method 400.

At 410, a first request is received from a first computing device, wherein the first request comprises a request identifier and a security token. For example, the computing device 310 can receive the request 341 comprising the request identifier 321 and the one or more security tokens 333. Additionally or alternatively, the computing device 310 can receive another request (not shown) comprising another request identifier and the one or more security tokens 333 and/or one or more other security tokens.

At 420, it is determined whether the received request is valid. Determining whether the received request is valid can comprise determining whether the request identifier in the request is associated with the security token in the request. For example, the computing device 310 can determine whether the request identifier 321 is associated with the one or more security tokens 333 in the request 341. If the request identifier 321 is associated with the one or more security tokens 333, then the computing device 310 can determine that the requested 341 is valid. However, if the computing device 310 determines that the request identifier 321 is not associated with one or more of the one or more security tokens 333, then the computing device 310 can determine that the request 341 is not valid.

Additionally or alternatively, determining whether the received request is valid can comprise determining whether the request was received from a computing device and/or service associated with the request identifier. For example, the computing device 310 can determine whether the request 341 was received from a computing device and/or service associated with the request identifier 321. In an embodiment where the computing device 310 transmits the request identifier 321 and the one or more security tokens 333 to a source computing device or a service running on the source computing device, the computing device 310 can determine whether the request 341 is received from the source computing device or service running on the source computing device. If the computing device 310 determines that the request 341 is received from a computing device and/or service associated with the request identifier 321, then the computing device can determine that the request is valid. However, if the computing device 310 determines that the request 341 is not received from a computing device and/or service associated with the request identifier 321, then the computing device 310 can determine that the request is invalid.

If it is determined at 420 that the request is valid, then at 430 a second request that comprises a protected data item associated with the security token is generated, as described herein, and, at 440, the second of the request is transmitted to a second computing device.

However, if it is determined at 420 that the request is invalid then, at 450, the request is rejected. Rejecting the request can comprise transmitting a response indicating that the request is invalid. For example, the computing device 310 can transmit a response (not shown) indicating that the request 341 or another request is invalid.

FIG. 5 is a diagram depicting an example request 500 comprising a request identifier 501 and a plurality of security tokens 533, 543, 553, 563, and 573. The example request 500 can be received and processed by a computing device in any of the systems described herein. For example, the request 500 can be received and processed by the server computer 110 from the server computer 120 in the example system 100 depicted in FIG. 1. For example, the request 500 can be received and processed by the computing device 310 depicted in FIG. 3. In some embodiments, all or part of the contents of the example request 500 depicted in FIG. 5 can be part of a data payload included in the request.

The example request 500 is formatted using a JavaScript Object Notation (JSON). However, this is not intended to be limiting. Other formats for requests comprising request identifies and one or more security tokens are possible.

In addition to the request identifier 501 and the plurality of security tokens 533, 543, 553, 563, and 573, the example request 500 comprises a partial request 502 to be processed by another computing device (such as the server computer 130 depicted in FIG. 1). In the example depicted in FIG. 5, the partial request 502 comprises a partial HTTP request. However, other types of requests are possible. The partial request 502 comprises a field 503 that indicates that the request should be an HTTP GET request. The partial request 502 further comprises a field 505 that indicates a path for the request. The partial request 502 further comprises a field 507 that defines headers 509 and 511 to be included in the request. The partial request 502 further comprises a field 513 that defines a partial body for the request.

The example request 500 further comprises a collection 520 of privileged operations 521-529. The privileged operations 521-529 can be processed by a computing device to modify the contents of the partial request 502 by replacing a security token with a protected data item associated with the security token. For example, each of the privileged operations 521-529 contains a security token and a path within the partial request 500 to where a protected data item associated with the security token should be placed.

The privileged operation 521 contains the security token 533 and a path 531, indicating that a protected data item associated with the security token 533 should be placed in an "amount" field of the partial request body 513. The privileged operation 523 contains the security token 543 and a path 541, indicating that a protected data item associated with the security token 543 should be placed in a "cardInfo.cardNumber" field of the partial request body 513. The privileged operation 525 contains the security token 553 and a path 551, indicating that a protected data item associated with the security token 553 should be placed in a "cardInfo.expiryDate" field of the partial request body 513. The privileged operation 527 contains the security token 563 and a path 561, indicating that a protected data item associated with the security token 563 should be placed in a "billingActor.name" field of the partial request body 513. The privileged operation 529 contains the security token 573 and a path 571, indicating that a protected data item associated with the security token 573 should be placed in a "billingActor.address" field of the partial request body 513.

Figure 6:
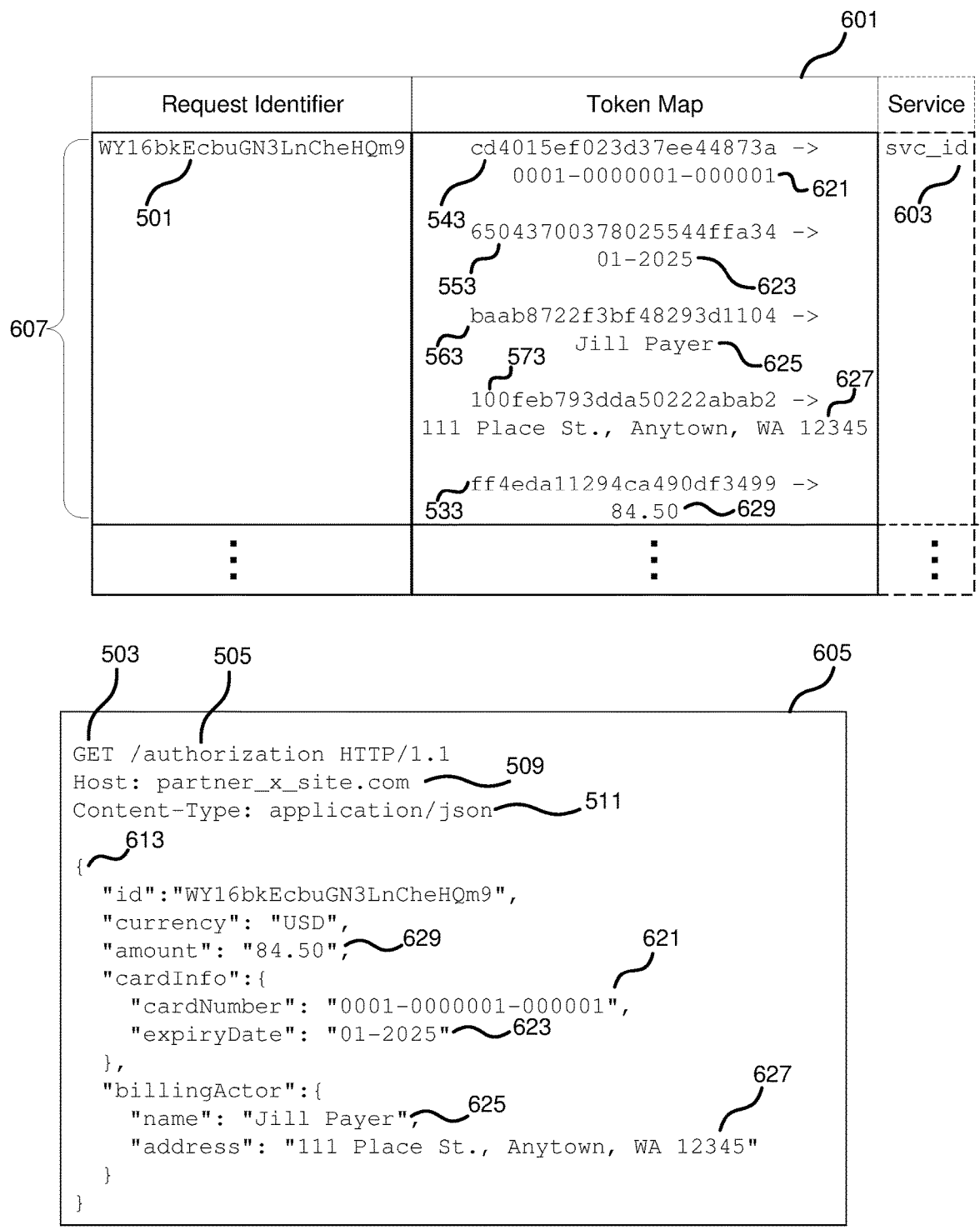
FIG. 6 is a diagram depicting an example security token store and an example modified request.

FIG. 6 is a diagram depicting an example security token store 601 and an example request 605 that is based on a security record 607 contained in the security token store 601 and the request 500 depicted in FIG. 5.

The security token store 601 can comprise one or more security records (e.g., 607) that associate request identifiers (e.g., 501) with one or more security tokens (e.g., 533, 543, 553, 563, and 573). A computing device that receives the request 500 can use the request identifier 501 to locate the security record 607 in the security token store 601. The computing device can then verify that the request 500 is authorized by determining that the security record 607 associates the request identifier 501 contained in the request 500 with the plurality of security tokens 533, 543, 553, 563, and 573 contained in the request 500. Optionally, the security record 607 can include a service identifier 603 of a service associated with the request identifier 501. In such an embodiment, verifying that the request 500 is authorized can comprise determining that the request 500 is associated with the service identified by the service identifier 603.

The security record 607 comprises a token map, in which the security tokens 533, 543, 553, 563, and 573 that are associated with the request identifier 501 are mapped to associated protected data items 621-629. For example, the security token 543 is associated with the protected data item 621, the security token 553 is associated with the protected data item 623, the security token 563 is associated with the protected data item 625, the security token 573 is associated with the protected data item 627, and the security token 533 is associated with the protected data item 629.

A computing device that receives the request 500 can use the partial request 502 and the privileged operations 521-529 included in the request 500, along with the security record 607, to generate the example request 605. For example the request 605 includes the values of the command field 503, the path field 505, and the headers 509 and 511 specified in the partial request 502. The request 605 further comprises a completed version 613 of the partial request body 513, in which the protected data items 621-629 that are associated with the security tokens 533, 543, 553, 563, and 573 have been placed in the partial body 513 based on the privileged operations 521-529. The security token was 533, 543, 553, 563, and 573 (and their associated privileged operations) have been replaced in the request 605 with their respective protected data items, and thus are no longer present in the request.

FIG. 7 is a diagram depicting an example transmission 700 comprising the request identifier 501 and the plurality of security tokens 533, 543, 553, 563, and 573. In any of the example systems described herein, the example transmission 700 can be transmitted to a computing device (or service running on a computing device) in order to cause the computing device (or service running on the computing device) to generate a request comprising the request identifier 501 and the plurality of security tokens 533, 543, 553, 563, and 573. For example, the server computer 110 depicted in FIG. 1 can transmit the transmission 700 to the server computer 120 in order to cause the server computer 122 generate the example request 500. For example, the computing device 310 depicted in FIG. 3 can transmit the term and submission 700 to a source computing device in order to cause the source computing device to generate the example request 500.

The transmission 700 comprises data item types 701-709 of the protected data items 621-629 that are associated with the security tokens 533, 543, 553, 563, and 573. A computing device that receives the transmission 700 can use the data item types 701-709 when generating the request 500. For instance, in the example depicted in FIG. 5, the paths 531, 541, 551, 561, and 571 in the privileged operations 521-529 can be based on the data item types 701-709 that are associated with the security tokens 533, 543, 553, 563, and 573.

Figure 8:
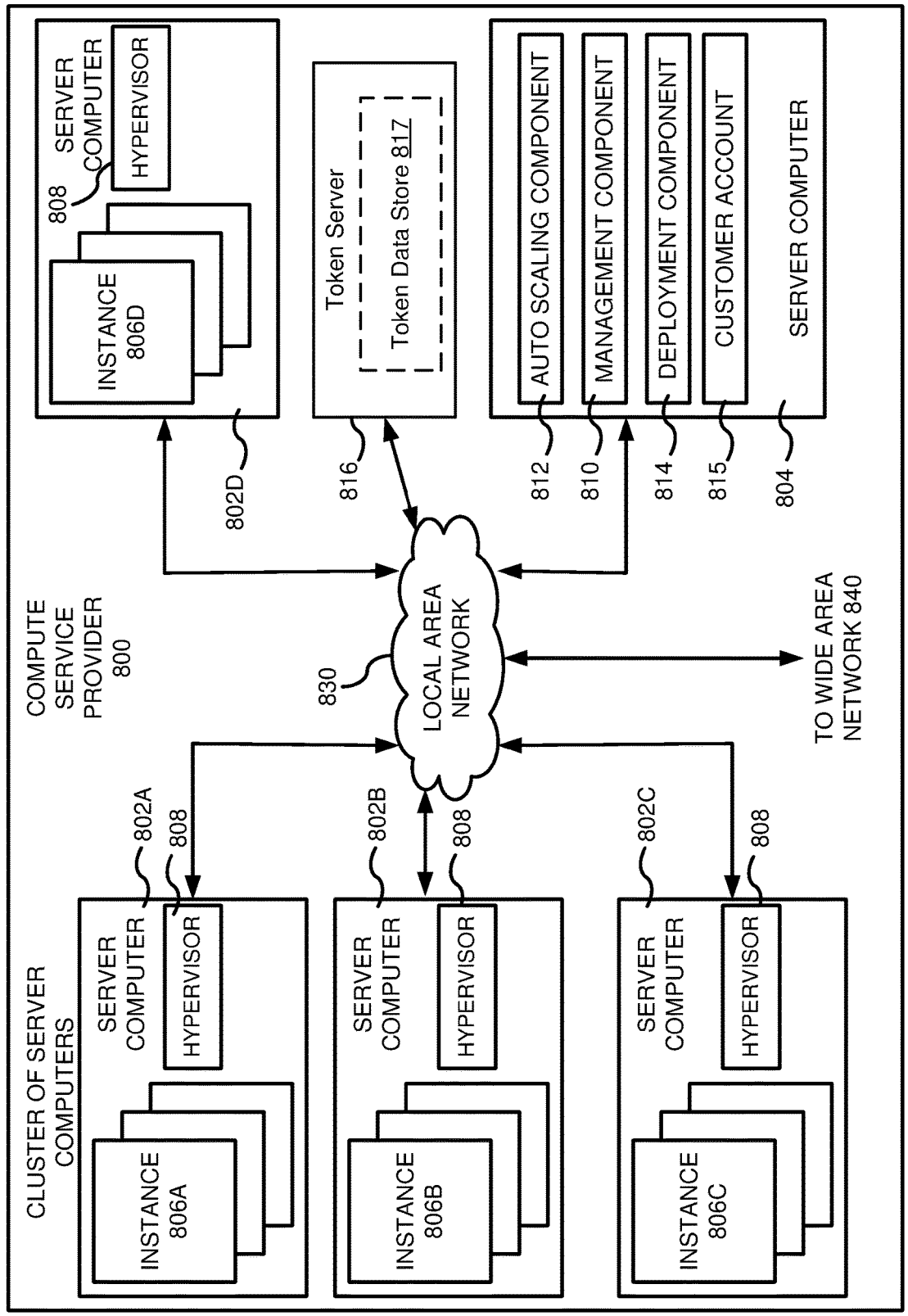
FIG. 8 is an example system diagram depicting a plurality of virtual machine instances running in a multi-tenant environment comprising a server computer configured to process requests comprising request-scope security tokens.

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (i.e. a computer) that executes applications like a physical machine. In the example, each of the servers 802A-802D can be configured to execute a hypervisor 808 or another type of program configured to enable the execution of multiple instances 806 on a single server. For example, each of the servers 802A-802D can be configured (e.g., via the hypervisor 808) to support one or more virtual machine slots, with each virtual machine slot capable of running a virtual machine instance (e.g., server computer 802A could be configured to support three virtual machine slots each running a corresponding virtual machine instance). Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can comprise Clos networks or other types of multi-tiered network fabrics. The network 830 can be a local area network (LAN) and can be connected to a Wide Area Network (WAN) 840 so that end users can access the compute service provider 800. It should be appreciated that the network topology illustrated in FIG. 8 has been simplified and that many more networks and network devices can be utilized to interconnect the various computing systems disclosed herein.

A server computer 816 is configured to process requests comprising request identifiers and security tokens as described herein. For example, the server computer 816 can be configured to receive requests comprising request identifiers and security tokens via the network 830 from one or more of the instances 806. The server computer 816 can validate such a request by determining whether a request identifier contained within the request is associated with all of the security tokens that are also contained within the request. For example, the server computer 816 can comprise a token data store 817 and can search the token data store 817 for a security record associated with the request identifier. If a record associated with the request identifier is found, the server computer 816 can determine whether or not the record contains all of the security tokens included in the request. If a record for the request identifier cannot be found, or if it does not contain all the security tokens included in the request, then the server computer 816 can reject the request. However, if the record is found and it contains all the security tokens, then the server computer 816 can generate another request (such as a modified version of the received request) that comprises protected data items that are associated with the security tokens. The server computer 816 can then transmit the another request to another computing device for processing. The another computing device can be one of the server computers 802. Additionally or alternatively, the server computer 816 can transmit the another request via the wide area network 840 to a computing device that is external to the compute service provider 800.

In at least some embodiments, determining whether a request is valid can comprise determining that a request identifier contained within the request is associated with a service that is running on one or more of the instances 806, and then determining whether the request was generated by that service.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 can store software 980 implementing one or more innovations described herein, (for example, in the form of computer-executable instructions suitable for execution by the processing unit(s)). In at least some embodiments, the computing environment 900 can comprise a server computer or other computing device as described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 can store instructions for the software 980 implementing one or more innovations described herein (for example in a storage medium and/or firmware of the storage 940).

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the communication connection(s) can connect the computing environment 900 to a computer network as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
a first server computer comprising a security token associated with a protected data item and a request identifier associated with the security token, wherein the first server computer is configured to:
transmit the request identifier and the security token to a second server computer;
receive a request from the second server computer, wherein the request comprises the request identifier and a data payload comprising the security token,
determine that the request identifier is associated with the security token,
based on the determination that the request identifier is associated with the security token, generate a modified version of the data payload, wherein the modified version of the data payload comprises the protected data item associated with the security token, and
transmit a request comprising the modified version of the data payload to a third server computer; and
the second server computer, wherein the second server computer is configured to:
receive the request identifier and the security token from the first server computer,
generate the data payload comprising the security token, and
transmit the request comprising the request identifier and the data payload to the first server computer.

2. The system of claim 1, wherein the first server computer is further configured to:
receive another request, wherein the another request comprises another request identifier and another data payload comprising the security token;
determine that the another request identifier is not associated with the security token; and
reject the another request.

3. The system of claim 1, wherein:
the second server computer comprises a service configured to generate the data payload; and
the first server computer is further configured to:
associate the request identifier with the service,
determine that the request is associated with the service, and
generate the modified version of the data payload based on the determination that the request identifier is associated with the service and the determination that the request identifier is associated with the security token.

4. The system of claim 3, wherein the first server computer is further configured to:
receive another request comprising the request identifier;
determine that the another request is not associated with the service; and
reject the another request.

5. The system of claim 1, wherein the first server computer is further configured to transmit the request identifier, the security token, and a data item type of the protected data item associated with the security token to the second server computer.

6. The system of claim 1, wherein the generating the modified version of the data payload comprises replacing the security token in the data payload with the protected data item.

7. The system of claim 1, wherein:
the first server computer is further configured to:
receive a request for processing by the third server computer from a client computing device associated with the protected data item; and
responsive to receiving the request from the client computing device:
generate the request identifier and the security token,
associate the security token with the protected data item and the request identifier, and
transmit the request identifier and the security token to the second server computer.

8. A method, comprising:
transmitting a request identifier and a security token from a first computing device to a second computing device;
receiving, in the first computing device, a first request from the second computing device, wherein the first request comprises the request identifier and the security token within a payload;
determining, in the first computing device, that the security token is associated with the request identifier;
based on the determining, generating a second request, wherein the second request comprises a protected data item associated with the security token, wherein the generating of the second request includes modifying the payload of the first request by replacing the security token with the protected data item within the modified payload such that the protected data item is located in a position associated with its data item type; and
transmitting the second request from the first computing device to a third computing device.

9. The method of claim 8, further comprising:
receiving another request from the second computing device, wherein the another request comprises the security token and another request identifier;
determining that the security token is not associated with the another request identifier; and
rejecting the another request.

10. The method of claim 8, further comprising:
generating the security token;
associating the security token with the protected data item;
generating the request identifier; and
associating the request identifier with the security token.

11. The method of claim 8, wherein transmitting the security token and the request identifier to the second computing device comprises:
transmitting a message in which the security token is associated with a data item type of the protected data item.

12. The method of claim 8, wherein:
the first request comprises a plurality of security tokens, including the security token; and
the method further comprises:
determining that the request identifier is associated with the plurality of security tokens, and
generating the second request based on the determining that the request identifier is associated with the plurality of security tokens, wherein the second request comprises a plurality of protected data items associated with the plurality of security tokens.

13. The method of claim 8, further comprising:
associating the request identifier with a service;
determining that the request received from the second computing device is associated with the service; and
generating the second request based on the determining that the request identifier is associated with the security token and the determining that the first request is associated with the service.

14. A computing device, comprising:
a processing unit; and
a memory storing instructions that, when executed by the processing unit, cause the computing device to perform operations, the operations comprising:
transmitting a security token and a request identifier from a first server computer to a source computing device, which is a second server computer, wherein the security token and the request identifier are used for generation of requests;
receiving a request from the source computing device, wherein the request comprises the security token within a payload and the request identifier;
retrieving a security record associated with the request identifier;
determining, using the security record, that the request identifier is associated with the security token;
based on the determining, generating a second request comprising a protected data item associated with the security token, wherein the generating includes modifying the payload by replacing the security token with the protected data item within the modified payload and locating the protected data item in a position that is associated with its respective data type; and
transmitting the second request to a destination computing device, which is a third server computer.

15. The computing device of claim 14, wherein the operations further comprise:
receiving another request from the source computing device, wherein the another request comprises the security token and another request identifier;
retrieving another security record associated with the another request identifier;
determining, based on the another security record, that the another request identifier is not associated with the security token; and
rejecting the another request.

16. The computing device of claim 14, wherein the operations further comprise:
generating the security token;
associating the security token with the protected data item;
generating the request identifier; and
associating the security token with the request identifier using the security record.

17. The computing device of claim 16, wherein transmitting the security token and the request identifier to the source computing device comprises:
transmitting a message in which the security token is associated with a data item type of the protected data item.

18. The computing device of claim 14, further comprising:
associating the request identifier with a service;
determining that the request received from the source computing device is associated with the service; and
generating the second request based on the determining that the request identifier is associated with the security token and the determining that the request is associated with the service.

19. The computing device of claim 14, wherein:
the operations further comprise:
deleting the security record after transmitting the second request to the destination computing device.

20. The computing device of claim 14, wherein:
the request comprises a request for an operation to be performed by the destination computing device using the protected data item.

* * * * *